United States Patent Office 2,871,579
Patented Feb. 3, 1959

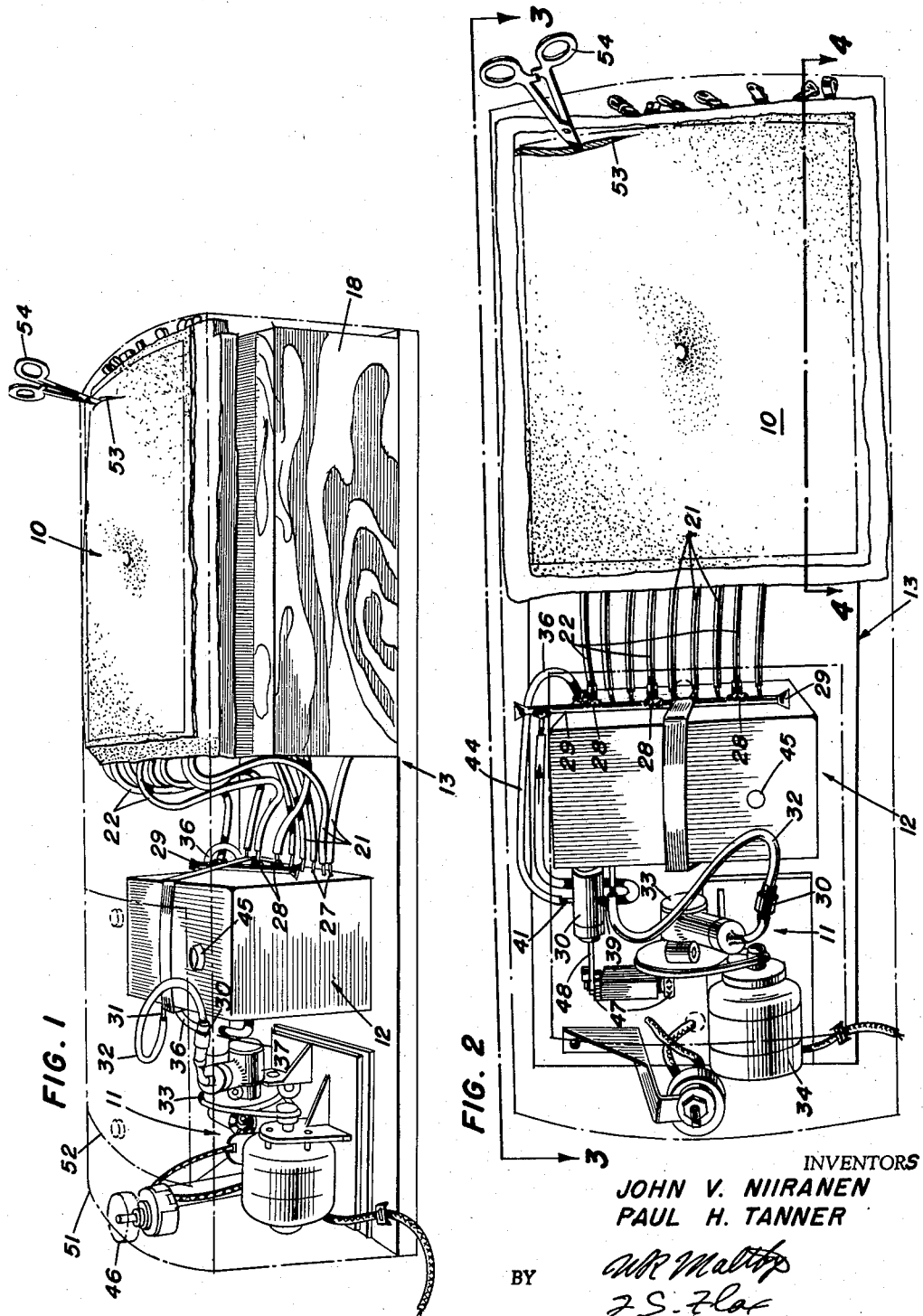

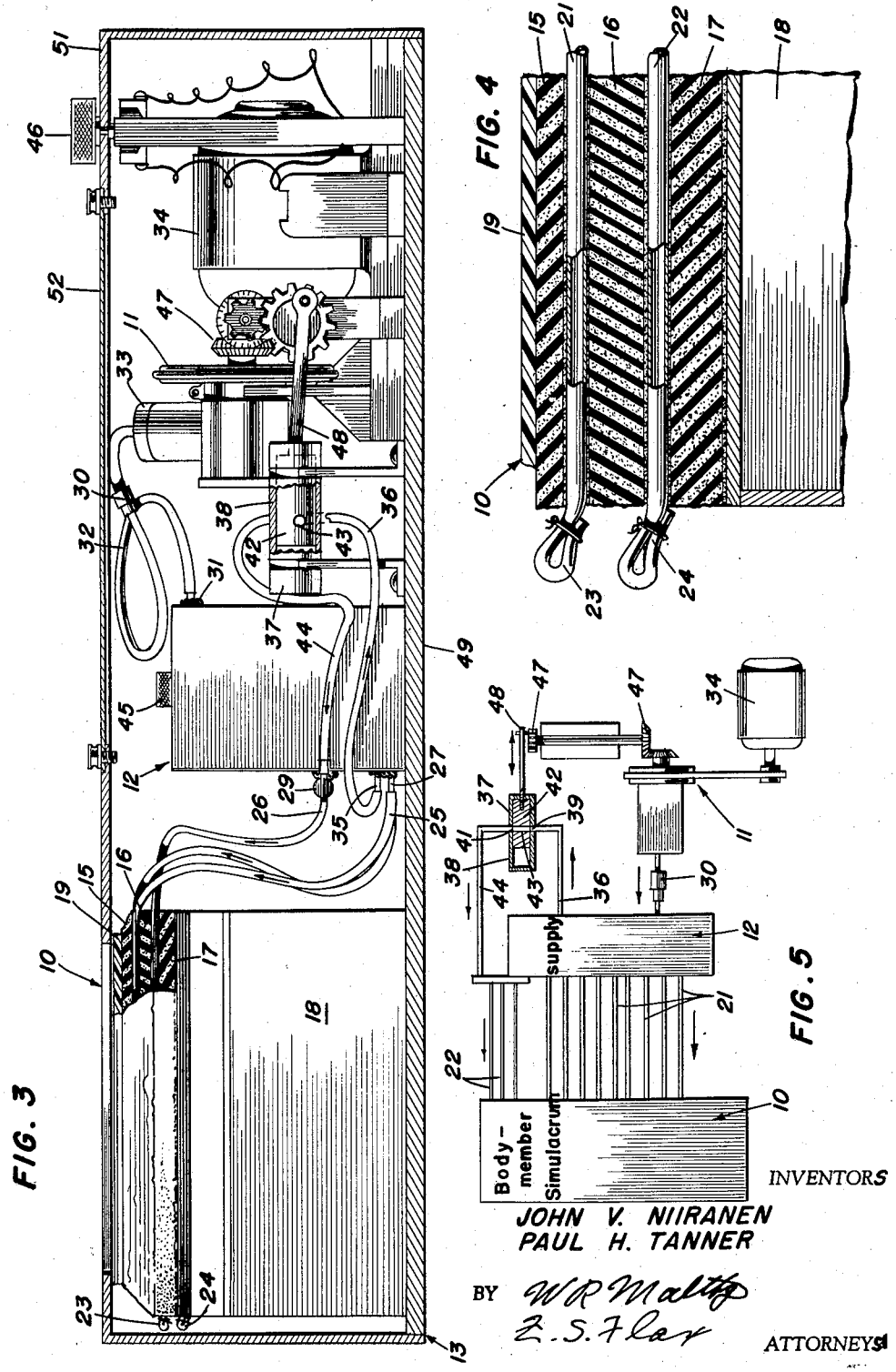

2,871,579

SURGICAL BODY-MEMBER SIMULACRUM FOR TEACHING FIRST AID

John V. Niiranen, Bethesda, Md., and Paul H. Tanner, Washington, D. C., assignors to the United States of America as represented by the Secretary of the Navy Application May 31, 1956, Serial No. 588,584

5 Claims. (Cl. 35—17)

(Granted under Title 35, U. S. Code (1952), sec. 266)

The invention described herein may be manufactured and used by or for the Government of the United States of America for governmental purposes without the payment of any royalties thereon or therefor.

The present invention relates to a surgical body-member simulacrum for teaching first aid and more particularly to an artificial body-member, such as an abdomen or the like with simulated layers of skin, adipose tissue, and blood vessels arranged in combination with a motor for simulating "arterial" and "venous" pressure and pulsebeat, and a reservoir for simulated blood, for training advanced first aid students, doctors, nurses, and medical technicians in the various wound closure and blood vessel clamping techniques. By the term "surgical body-member simulacrum" is meant a device which is a mock image of a living mammalian body member, not necessarily identical in appearance, but responding to touch and surgery substantially in the manner of a human body, or part thereof, or the like.

In teaching programs designed to teach advanced first aid, such as in conjunction with disaster training, it is important to demonstrate and teach wound closing procedures involving clamping of blood vessels, tying blood vessels, suturing, and bandaging. For the earnest first aid or medical student who does not want to approach a wound closure problem without experience, or who is not thoroughly familiar with the reactions of body fluids, such as the reactions of venous or arterial blood under normal body pressures, it is an indispensible necessity to rehearse such wound closing procedures before they are attempted on a living human being, lest they be harmful or fatal.

Cadavers, even if available for the practice of first aid, which is seldom, behave quite differently from a live body. A cadaver does not show the reactions of body fluids, such as flowing blood, which demands primary consideration in wound closing procedures. For the same reason, other more available mock images, previously used, such as papier-mache mock-ups, or a piece of felt secured to a board, are inadequate in teaching such wound closure procedures. Furthermore, such mock-ups or boards are stiff and hard, and do not react to touch as does live skin and body tissue.

By way of contrast, one primary object of this invention is to offer an article, as least part of whose structure is directed to the sense of touch of the student, so that he can sense problems associated with the resilience of living tissue. In addition, it is an object of this invention to offer an article, not only for the sense of direct touch and feel, but also for indirect touch, or resilient pressure effect exerted in the application of instruments, implements, clamps, sutures, etc. Thus, is provided, in connection with a surgical bodymember simulacrum, the reactions formerly experienced only with living anatomical bodies; for instance, feel and pressure reactions in respect to hardness and resilience, tensile and compressive strength, reactions produced by body fluids, etc.

Another principal object of the present invention is to provide a simple and efficient device for training first aid students and medical personnel in the techniques of human body wound closure and blood vessel clamping.

Still another object of the present invention is to provide a medical training device having the advantages mentioned above which will associate in the minds of those attempting to develop this technique the relationship between layers of skin, adipose tissue and underlying veins and arteries filled with flowing blood, and the pulsebeat inherent thereto.

A further object of this invention is to produce a device of the character described at a relatively low cost of manufacture.

Other objects and many of the attendant advantages of this invention will be readily appreciated as the same becomes better understood by reference to the following detailed description when considered in connection with the accompanying drawings wherein Fig. 1 is a side view in perspective showing the entire system with a housing shown in phantom.

Fig. 2 is a top view of the entire system.

Fig. 3 is a sectional drawing taken along lines 3—3 of Fig. 2 and shows the details of the simulated blood supply reservoir, pump, and conduits, on the side opposite from Fig. 1, and is partially cut away to better illustrate the internal structure of the device.

Fig. 4 is a sectional drawing taken along lines 4—4 of Fig. 2 and shows the simulated "veins," "arteries," "adipose tissue," and "skin" of the body-member simulacrum.

Fig. 5 is a schematic flow diagram of the entire system, shown in plan view.

Referring now to the drawings, wherein like reference characters designate like or corresponding parts throughout the several views, there is shown, particularly in Fig. 1, the four major portions of the invention: the body-member simulacrum 10, the motor-driven pump system 11 for producing both simulated "arterial" and "venous" pressure, the supply tank or reservoir 12 for simulated blood, and a supporting base and housing 13.

The body-member simulacrum 10 may be in any shape to simulate the structure of a living body member. One embodiment illustrated in Fig. 4 is made to simulate the structure of an abdomen, or the like. The abdomen simulacrum 10 which is illustrated in detail and in cross-section in Fig. 4, and in the cut-away section of Fig. 3, comprises three layers of foam or sponge rubber, 15, 16, and 17, of which two, 16 and 17, are preferably one-half inch thick layers and the other, 15, is preferably a one-quarter inch thick layer, all cut to proper size to fit on a supporting pedestal 18. Before assembling the three layers of foam rubber, a thin layer of skin-colored vinyl resin, 19, is cured on the outer surface of layer 15 of foam rubber. The vinyl resin may be cured by placing it under a heat lamp and later into a dry heat oven. Various sized flexible tubes, 21, 22, preferably made of latex rubber, are placed between the layers of foam rubber 15 and 16, and between 16 and 17, and the surfaces of these said layers of foam rubber are then covered with rubber cement. The assembled foam rubber, latex tubes and vinyl resin are pressed firmly together to allow the rubber cement to bond the layers and tubing together. At one end of each tube, 23, 24, the latex tubes are cut and tied off to seal them up. At the other end, 25, 26, the tubes are left long to facilitate their attachment to either the supply tank 12, containing simulated blood fluid or to a manifold 29.

The supply tank 12 has a number of outlets 27, e. g. ten, for the simulated "venous" system of latex tubing. These outlets 27 are shown more clearly in Fig. 3. In addition to these simulated "venous" tubes 21, direct from the supply tank 12, a number of simulated "arterial" tubes 22, e. g. three, are joined to outlets 28 in a common manifold 29, mounted on the outside of the tank 12.

The tank 12 may be supplied with a continual steady air pressure, through inlet 31 by means of conduit 32 from a small air compressor 33, driven by electric motor 34. A check valve, 30, placed in conduit 32 will prevent any back-flow of fluid into the compressor. Any other means such as a hydraulic pump, may also be used to impart hydraulic pressure to the liquid in tank 12.

In order to simulate the "pulse-beat" of arterial flow the "arterial" supply of fluid passes from an outlet 35 in the supply tank 12, through conduit 36, and through an on-off valve 37. One embodiment of an on-off valve 37, comprises a cylinder barrel 38, having inlet port 39 and outlet port 41 on opposite sides of the cylinder, in which a reciprocating piston 42, having a through opening 43, thereacross, serves to allow passage of fluid through the valve only when the opening 43 is aligned with inlet port 39 and outlet port 41.

A conduit 44 joins the outlet port 41 with manifold 29 in order to supply "arterial" pulsating flow thereto. The pulsating flow is then transmitted from the manifold 29 into the "arterial" tubes 22.

The supply tank 12 is a closed unit with a removable air-tight opening 45 for replenishing the colored synthetic "blood." The latter may be simply distilled water with red vegetable dye added.

The motor 34 and air compressor 33 may be of the type commonly used with pneumatic instruments in dentistry, modified by the addition of a gear train 47 and bell crank 48 to produce an interrupted flow so as to simulate a pulse-beat through the use of an on-off valve, such as 37. The speed of the motor 34 may be controlled by means of a rheostat 46, thereby controlling the rate at which the piston 42 reciprocates in valve 37, and thereby controlling the "pulse-beat" in the "arteries" 22.

The supporting pedestal 13 on which the simulacrum 10 rests may be constructed in the form of an arch, using plywood or any other suitable material. A metal covering or pan around the pedestal may be used to catch escaping fluids during the use of the training aid.

The entire mechanism should be secured to a base 49, e. g. ¾ inch plywood, and may be covered by a removable housing 51. An opening with an access door 52 should be left in the housing for easy access to the mechanism.

In using the teaching device, an incision 53 may be started at the far end of the body-member simulacrum, and as the surgical instrument 54 punctures or severs one of the simulated "veins" 21, a steady stream of simulated blood will issue, which can then be clamped and tied, and the "wound" sutured. Similarly, as the surgical instrument punctures or severs one of the simulated "arteries" 22, an intermittent stream of simulated blood with a simulated "pulse-beat" will issue, which can be clamped and tied and the wound similarly sutured. As aforestated, the "pulse-beat" may be increased or decreased in frequency by adjustment of the rheostat 46.

By making subsequent incisions progressively adjacent to the old incisions, eventually the entire area of the simulacrum will be used, at which time a new, previously assembled simulacrum may be attached into position on the supporting pedestal.

Whereas the foregoing description has been directed somewhat to an abdomen simulacrum, it should be understood that it is within the scope of the invention to employ as such simulacrum a manikin of an entire mammalian body, or any portions thereof, including simulated arms, legs, etc., embodying the novel features herein described.

In this manner, the device described serves as an inexpensive and effective teaching aid to effectively demonstrate wound closing procedures involving clamping of blood vessels, tying of blood vessels, suturing, and bandaging, dramatically showing the student reaction of flowing blood in both veins and arteries, simulating the pulse-beat inherent thereto, and at the same time offering an article which gives somewhat the same reaction to touch and feel as that of living tissue.

It should be understood, of course, that the foregoing disclosure relates to only preferred embodiments of the invention, and that it is intended to cover all changes and modifications of the example of the invention herein chosen for the purpose of the disclosure, which do not constitute departures from the spirit and scope of the invention set forth in the appended claims.

What is claimed is:

1. A teaching device comprising a simulacrum of a living body-member having therein flexible conduits for containing a liquid simulating blood, a supply tank connected to said conduits for supplying said liquid, pressure producing means connected to said tank for imparting pressure to said liquid, and an on-off valve joined intermediate said supply tank and at least one of said conduits for producing a simulated pulse-beat therein.

2. A surgical body-member simulacrum for teaching first aid comprising an artificial body-member having therein simulated layers of skin, simulated adipose tissue, and conduits simulating blood vessels, a reservoir for supplying a liquid simulating blood arranged in combination with said blood vessel conduits, pressure producing means associated with said blood vessel conduits for imparting pressure to the liquid therein, and a cyclically intermittent on-off valve intermediate between said reservoir and at least one of said conduits for applying the liquid pressure periodically, whereby cutting said conduit connected through the on-off valve to said reservoir will release at the point so cut said liquid in a pulsating flow, and whereby cutting a conduit directly connected to said reservoir will release at the point so cut a continuous flow of liquid.

3. In a surgical simulacrum for teaching first aid, a plurality of layers of resilient materials, a plurality of tubular conduits arranged intermediate at least two of said layers, said conduits being capable of being cut by surgical instruments, one end of each of said tubular conduits being closed off, a reservoir of liquid under pressure connected to the other end of each of said conduits, and a cyclically intermittent on-off valve connected intermediate between at least one of said conduits and said reservoir for imparting a pulsating effect to the pressure therefrom.

4. A surgical body-member simulacrum for teaching first aid comprising an artificial body-member having therein simulated layers of skin, means for providing a supply of simulated blood to said artificial body means, blood transfer means connecting said supply means and said artificial body member for transferring blood under pressure, a conduit connecting said blood supply means and a selected number of said blood transfer means, a cyclically intermittent on-off valve in said connecting conduit, and means actuating said on-off valve to apply an intermittent stream of simulated blood to simulate the pulse-beat of arteries.

5. A surgical body-member simulacrum for teaching first aid comprising an artificial body-member having therein simulated layers of skin, means for providing a supply of simulated blood to said artificial body means, blood transfer means connecting said supply means and said artificial body member for transferring blood under pressure, a conduit connecting said blood supply means and a selected number of said blood transfer means, a cyclically intermittent on-off valve in said connecting conduit, and means actuating said on-off valve to apply an intermittent stream of simulated blood to simulate the pulse-beat of arteries, said on-off valve comprising a cylinder chamber, aligned inlet and outlet port means in said chamber, a reciprocating piston having a through opening slidably retained in said chamber and means reciprocating said valve so that simulated blood passes from the blood supply means to the blood transfer means only when the piston through the opening is aligned with the port means, thereby simulating the action of arterial blood in the human body.

References Cited in the file of this patent

UNITED STATES PATENTS

| | | |
|---|---|---|
| 2,324,702 | Hoffman | July 30, 1943 |
| 2,752,697 | Lawall | July 3, 1956 |